Patented Sept. 26, 1933

1,928,123

UNITED STATES PATENT OFFICE 1,928,123

SILICATE GEL MANUFACTURE

William McAfee Bruce, Mount Holly, N. J., assignor to The Permutit Company, New York, N. Y., a corporation of Delaware No Drawing. Application November 23, 1931 Serial No. 576,954

7 Claims. (Cl. 23—113)

This invention relates to improvements in silicate gel manufacture; and it comprises an improved process of making a water softening zeolite gel in granular form from sodium silicate and acid and alkali compounds of alumina, wherein solutions of the reagents in relatively high concentrations are mixed with immediate formation of a gel and the immediately formed gel is malaxated and disintegrated in its mother liquor to which may then be added further batches of solutions of the reagents in still higher concentrations with further gel formation, the final gel mixture being malaxated to a smooth uniform pulp, this pulp being subsequently dried and washed, usually being pressed before drying; all as more fully hereinafter set forth and as claimed.

Base exchange silicates or water softening zeolites in gel form have been made by mixing a solution of sodium silicate, usually a commercial waterglass solution, with a solution either of sodium aluminate or of aluminum sulfate. The reagents may be in such concentrations in their respective solutions as to give upon mixture of the solutions gelatinous precipitates, which may be jellies including all, or the greater part of, the reagent liquids so mixed, a full volume gel or jelly being the result of the use of the more concentrated reagent solutions. It has been considered advantageous to use solutions of strong enough concentrations to form jellies, but dilute enough to permit uniform admixture of the solutions before gelation.

In prior and copending applications, Serial No. 308,888, filed Sept. 27, 1928 and Serial No. 487,918, filed Oct. 10, 1930, I have described and claimed processes of making base exchange zeolite gels by mixing solutions of sodium silicate with solutions both of sodium aluminate and aluminum sulfate, the reagents being so proportioned as to produce a predetermined silica ratio in the product and to leave the mother liquor alkaline and the reagent concentrations advantageously being such as to permit completion of the mixing before gelation goes forward to any great extent, the liquid mixture being then allowed to set into a stiff, firm jelly.

In the art it is usual to partially dry wet gels formed in the reagent solution mixtures, with or without pressing or filtering to remove some mother liquor, and to submit the dried gels, still containing constituents of the mother liquor, to the action of water to produce a breaking up and granulation. With proper conduct of the operation, the granules formed by the disintegrating action of water are of the right size for water softening purposes. In the art there is a tacit assumption that the gel as originally formed in the solution mixtures has a cellular or honeycomb structure equivalent to a granular structure; and that this granular structure is preserved during the drying operation and appears when the dry material, which may be a press cake, is disintegrated by water.

I have discovered that it is not necessary to preserve the original structure of the gel or jelly as formed in the reagent mixture and that it is not necessary to use solutions of such strength as to permit uniform admixture before gelation. I have found that excellent water softening gels of a rugged, granular structure are obtained by using solutions of relatively high concentrations which cause a formation of gel immediately upon or during admixture and by keeping the solutions during admixture and for some time thereafter in continual agitation, so that the gel as formed is malaxated and its structure disintegrated to a pasty pulp. This pulped gel may be pressed as in a filter press or hydraulic press and then dried at a moderate temperature in usual ways. It may however, if desired, be allowed to stand for a time and then dried without pressing. Usually it is economical to press out some of the mother liquor before drying. Upon treating the dry gel with water it breaks up into hard granules of a good size for use in a bed softener.

In particular, I have found that the processes of my above mentioned copending applications are improved by using stronger solutions of sodium silicate, sodium aluminate and aluminum sulfate, and malaxating the gel as formed and after formation in its mother liquor before pressing and drying. The use of more concentrated solutions has the manifest advantage of requiring less water removal from the wet gel and malaxation followed by pressing and drying has, as I have found, the effect of producing a granular rigid structure in the dried gel with final formation of granules well adapted for continuous use in the regenerative water softening process. The result is a lower cost of production without sacrifice of the quality of the products.

By applying my improved method to existing manufacturing operations it is possible to obtain a greatly increased production from an existing plant. Heretofore, in making gel zeolites by the three-reagent process it has been customary, in order to produce slow gelling mixtures of solutions of sodium silicate, aluminum sulfate and sodium aluminate, to mix solutions of these reagents in concentrations not greater than 4° Baumé, 6° Bé. and 5° Bé., respectively. In the improved method of the present invention concentrations exceeding 10° Bé. for the silicate, 7° Bé. for the sulfate and 6° Bé. for the aluminate are possible.

It has also been found that by conducting the admixing and malaxating in two or more stages the concentrations of the solutions admixed in the second stage may be as high as or higher than 19° Bé. for the silicate, 13° Bé. for the sulfate and 12° Bé. for the aluminate. Subsequent additions of the reagents in still higher concentrations may be made. In a two step mixing of the reagent solutions, lower concentrations, such as 10°, 7° and 6° Bé, respectively, are used in the first step and after the gel resulting from this mixture has been formed and malaxated, solutions of higher concentrations are poured into the malaxated pulp and thoroughly mixed, the water of the first mixture serving to dilute the stronger solutions employed in the second mixing and malaxating step. By this two-stage procedure it is possible to obtain a smooth malaxated uniform gel pulp from solutions of relatively high concentration more advantageously than by using the more highly concentrated solutions in a single stage mixture; the gel being in the later case so dense and tough that it is difficult to reduce it subsequently to a uniform pulp by malaxation and disintegration.

Higher concentrations than those named above can be used but with such higher concentrations it is advisable to wash the malaxated gels with water in order to reduce the content of sodium sulfate before pressing and drying.

In a typical and advantageous embodiment of the present invention the following solutions are made up:

(1) Sodium silicate solution approximately 10° Bé. containing per liter 22 grams $Na_2O$ and 67.5 grams $SiO_2$;

(2) Aluminum sulfate solution of approximately 7° Bé. containing per liter 15.8 grams $Al_2O_3$ and 33.8 grams $SO_3$;

(3) Sodium aluminate solution approximately 6° Bé. containing per liter 29 grams $Al_2O_3$ and 19.7 grams $Na_2O$.

To produce a zeolite having components in a ratio corresponding to the formula $$Na_2O.Al_2O_3.6SiO_2$$

the above three solutions may be mixed in proportions of 1245 liters of solution (1), 770 liters of solution (2) and 402 liters of solution (3)). Generally speaking, it is immaterial whether the aluminum sulfate is first mixed with the silicate solution and the aluminate solution added or whether the aluminate solution is mixed with the silicate solution first and the sulfate solution mixed with the silicate-aluminate mixture. First mixing the aluminate and silicate with subsequent addition to this mixture of the sulfate solutions has in most cases the advantage that relatively strong solutions of silicate and aluminate can be readily mixed together without formation of stiff curds requiring an extended time for malaxation in order to produce a uniformly pulped gel. When the sulfate solution is added to the mixed silicate-aluminate solutions a gradual increase in viscosity of the mixture occurs until about half the sulfate is added and then, as the second half of the sulfate solution is added, the viscosity of the malaxation mixture gradually decreases until a relatively thin, smooth, uniform pulp is obtained. When the strongly concentrated silicate and sulfate solutions are mixed an immediate gel formation occurs but malaxation of this gel by violent agitation usually presents no great difficulty and subsequent addition of the aluminate solution with continued malaxation produces a uniformly pulped gel. On the whole, I consider that the most advantageous order of mixing is to first add the aluminate solution to the silicate solution quickly with constant agitation during the addition and then to add the sulfate solution slowly and with violent agitation to the pulped gel formed by malaxating the silicate-aluminate mixture. After the addition of the last of the three reagent solutions, the agitation is continued until the gel has been thoroughly malaxated to the condition of a smooth, uniform paste or pulp, after which the pulp is pumped to a filterpress under a pressure of 60 pounds per square inch, and subsequently the press cake, which may be about 2 to 3 inches thick, is broken up and dried on stationary trays at a temperature of about 80° C. for 24 hours. Upon treating the dried cake with water in the usual way it breaks up into granules of the proper size for use in commercial water softening. The granules are washed to remove soluble salts and are then ready for use. They may be dried for shipment.

In a second typical embodiment of the invention exemplifying a two-stage mixing procedure, solutions of the same concentrations as those of solutions 1, 2 and 3 in the above example are used in the first stage of mixing; 830 liters of solution (1) being mixed with 514 liters of (2) and 268 liters of (3). The solutions are agitated during the admixing and the gel formed is malaxated as described in the first example to produce a thin paste. In the second stage of mixing the following solutions are used:

(4) Sodium silicate solution approximately 13.2° Bé. containing per liter 44 grams $Na_2O$ and 135 grams $SiO_2$;

(5) Aluminum sulfate solution approximately 12.8° Bé. containing per liter 31.6 grams $Al_2O_3$ and 67.6 grams $SO_3$ and (6) Sodium aluminate solution approximately 11.5° Bé. containing per liter 58 grams $Al_2O_3$ and 39.4 grams $Na_2O$.

While the agitation of the mixture of solutions 1, 2 and 3 continues, 415 liters of (4) and 134 liters of (6) may be added quickly and then 257 liters of (5) may be added more slowly and the agitation is continued until the gel mixture has been thoroughly malaxated to the condition of a smooth uniform pulp. The pulp is pressed at a pressure of 60 pounds per square inch and the press cake is broken up, dried, granulated and washed as in the first example.

It is to be noted that while the total volume of the solutions used in the second example is the same as the total of the solutions used in the first example, the total quantity of each of the reagents is one-third greater in the second example then in the first example. Consequently the quantity of gel produced is one-third greater in the second example than in the first; while the facilities required for mixing, agitating and malaxating are the same in both instances.

To produce the best product for purposes of water softening, the three reagents are proportioned as described in my copending applications cited ante, the sum of the soda in the silicate and aluminate being somewhat in excess of the quantity needed to neutralize the acid of the sulfate and to supply in addition one mol $Na_2O$ in the mixture for each mol $Al_2O_3$; the silica ratio being adjusted as desired by adjusting the proportions of alumina supplied respectively by the aluminum sulfate and the sodium aluminate. It has been found usually advantageous to so proportion the silicate and sulfate that a mol of $Na_2O$ is provided for each mol $Al_2O_3$ in addition to the $Na_2O$ required to combine with the $SO_3$ of the sulfate. However some latitude in the reagent proportioning is allowable, it being possible with adequate malaxation of the gel mixture to compensate some deficiency of alkali in the silicate by additional alkali supplied as aluminate.

I have found that the stagewise addition of the reagents in successively increasing concentrations is advantageous generally in silicate gel formation with malaxation of the gel as formed. For example, solutions of sodium silicate and sodium aluminate may be mixed in such proportions and concentrations as to form a gel immediately, this gel being malaxated as formed and reduced to a thin pasty pulp. To this pulp solutions of sodium silicate and of sodium aluminate in higher concentrations than those of the first solutions are added and the whole mass agitated to form a uniform pulp. Further additions of still more concentrated reagent solutions of the same or greater concentrations may be made with continued malaxation of the gel. The uniform malaxated gel pulp is then pressed and may be washed before drying, granulating and further washing.

I have found further that an excellent water softening silicate gel is economically produced by malaxation of a silicate-aluminate gel in its mother liquor and by mixing with this malaxated gel pulp solutions of sodium silicate and aluminum sulfate in relatively high concentrations and continuing the malaxation of the mixture. So doing, the reagent proportions can be adjusted to produce a final mixture containing an excess of alkali and a ratio of silica to alumina giving a rugged product of high base exchange capacity with good economy in the use of materials. In this process it may be advantageous in some cases to make the first gel from a mixture of all three reagents and then to add successive batches of silicate solution and of either aluminate or aluminum sulfate solution in concentrations greater than those of the first mixture and in amounts adapted to adjust the silica ratio and the alkalinity of the final mixture.

While I have described specifically the manufacture of gels using as raw materials sodium silicate and both sodium aluminate and aluminum sulfate as sources of alumina, the invention is applicable generally to gel manufacture from soluble silicates, alkaline solutions of metal oxides and non-alkaline metallic salts. For example, potassium silicate may be used as a source of silica and alkali for the gel; an alkali vanadate, stannate or similar compound of metal and alkali may replace aluminate and the metal salt may be an iron chloride or sulfate. Gels for special purposes such as for use as catalysts or catalyst carriers may be made from a wide variety of materials.

What I claim is:—

1. In the manufacture of silicate gels by mixing solutions of sodium silicate, aluminum sulfate and sodium aluminate to form gels which are subsequently pressed and dried, a process which comprises mixing solutions of the three reagents in concentrations such as to cause gel formation immediately upon mixing, malaxating said gel in its mother liquor during and after its formation, mixing with said malaxated gel solutions of said three reagents in greater concentrations than those of the first mixed solutions, malaxating the resulting mixed gel in its mother liquor to a uniform pulp, pressing said pulped gel to express liquid therefrom and drying the pressed gel.

2. In the manufacture of silicate gels, a process which comprises mixing solutions of sodium silicate, sodium aluminate and aluminum sulfate in volumes and concentrations causing gel formation immediately upon mixing, malaxating said gel in its mother liquor during and after its formation, mixing said malaxated gel with solutions of the reagents in smaller volumes and greater concentrations than those of the first solutions, malaxating the resulting mixed gel in its mother liquor to a uniform pulp and drying and washing the pulped gel.

3. In making silicate gels from gelling mixtures of solutions of sodium silicate and of alumina compounds with subsequent drying of the wet gels, a process which comprises mixing solutions of the reagents in concentrations such as to form a gel immediately upon mixing, malaxating the gel in its mother liquor during and after its formation, mixing with the malaxated gel solutions of the reagents in concentrations greater than those of the first mixed solutions and malaxating the resulting mixed gel in its mother liquor.

4. In the manufacture of a silicate gel by gelation of mixed solutions of sodium silicate and of one or more compounds of alumina with subsequent removal of water from the wet gel, a process which comprises mixing solutions of the reagents in concentrations such as to cause immediate gel formation, malaxating said gel in its mother liquor during and after its formation, successively mixing with said malaxated gel solutions of the reagents of greater concentrations than those of the first mixed solutions and of successively increasing concentrations and malaxating the resulting mixed gel in the mother liquor to a uniform pulp.

5. In the manufacture of silicate gels from mixed solutions of sodium silicate, sodium aluminate and aluminum sulfate, a process which comprises mixing solutions of sodium silicate and sodium aluminate in concentrations such as to form a gel immediately upon mixing, malaxating the gel in its mother liquor during and after its formation, mixing with the malaxated gel solutions of sodium silicate and of aluminum sulfate in greater concentrations than those of the first solutions mixed and malaxating the gel formed in the final mixture.

6. In the manufacture of silicate gels from mixed solutions of sodium silicate, sodium aluminate and aluminum sulfate, a process which comprises mixing solutions of the three reagents in concentrations such as to form a gel immediately upon mixing, malaxating the gel in its mother liquor during and after it formation, mixing with said malaxated gel solutions of sodium silicate and of sodium aluminate in greater concentrations than those of the first solutions of these reagents and malaxating the gel formed in the final mixture.

7. In the manufacture of a silicate gel by gelation of mixed solutions of sodium silicate and of one or more compounds of alumina with subsequent removal of water from the wet gel, a process which comprises mixing solutions of the reagents in concentrations such as to cause immediate gel formation, malaxating said gel in its mother liquor during and after its formation, successively mixing with said malaxated gel solutions of the reagents of greater concentrations than those of the first mixed solutions and malaxating the resulting mixed gel in the mother liquor to a uniform pulp.

WILLIAM McAFEE BRUCE.